US010063282B1

(12) United States Patent
Huang et al.

(10) Patent No.: US 10,063,282 B1
(45) Date of Patent: Aug. 28, 2018

(54) CHIP-TO-CHIP SIGNAL TRANSMISSION SYSTEM AND METHOD FOR ARRANGING CHIPS THEREOF

(71) Applicant: I-SHOU UNIVERSITY, Kaohsiung (TW)

(72) Inventors: Yu-Jung Huang, Kaohsiung (TW); Mei-Hui Guo, Kaohsiung (TW)

(73) Assignee: I-SHOU UNIVERSITY, Kaohsiung (TW)

( * ) Notice: Subject to any disclaimer, the term of this patent is extended or adjusted under 35 U.S.C. 154(b) by 0 days.

(21) Appl. No.: 15/657,209

(22) Filed: Jul. 24, 2017

(30) Foreign Application Priority Data

Apr. 6, 2017 (TW) .............................. 106111496 A

(51) Int. Cl.
*H04B 5/00* (2006.01)

(52) U.S. Cl.
CPC .................................. *H04B 5/0012* (2013.01)

(58) Field of Classification Search
CPC ........................... H04B 5/0012; H04B 5/0031
See application file for complete search history.

(56) References Cited

U.S. PATENT DOCUMENTS 6,823,501 B1 11/2004 Dahl
7,659,619 B1 * 2/2010 Zingher ............... H01L 23/48
257/735
2007/0075442 A1 * 4/2007 Krishnamoorthy ... G02B 6/12007
257/797
2009/0176450 A1 * 7/2009 Chow ..................... H01L 23/48
455/41.1
2012/0063455 A1 3/2012 Song et al.
2012/0182094 A1 7/2012 Kawamura
2013/0307159 A1 11/2013 Safran et al.

FOREIGN PATENT DOCUMENTS

TW 201421251 6/2014
TW 201431020 8/2014
(Continued)

OTHER PUBLICATIONS

A. Chow et al., "System Considerations for Wireless Capacitive Chip-to-Chip Signaling," IEEE International Symposium on Radio-Frequency Integration Technology, Dec. 2011, pp. 41-44.
(Continued)

*Primary Examiner* — Nguyen Vo
(74) *Attorney, Agent, or Firm* — JCIPRNET

(57) ABSTRACT

A chip-to-chip signal transmission system including a first unit set and a second unit set arranged in a first direction is provided. The first unit set and the second unit are configured to perform the signal transmission between a first chip and a second chip. There is a shift between the first unit set and the second unit set in a second direction such that the first unit set and the second unit set are shifted in the second direction and an overlapping region is formed. By adjusting the size of the overlapping region, the signal noise and the signal attenuation due to the misalignment between the first chip and the second chip or the electromagnetic interference of the adjacent signals are reduced and the signal transmission quality is thus improved. Furthermore, a method for arranging chips is also provided.

13 Claims, 8 Drawing Sheets

(56) References Cited

FOREIGN PATENT DOCUMENTS

TW          201503614       1/2015
TW          I539565         6/2016

OTHER PUBLICATIONS

Y.-J. Huang et al., "Differential Pad Placement Design of a Capacitive Coupling Based Stacked Die Package," IEEE Transactions on Components, Packaging and Manufacturing Technology, vol. PP, Issue 99, Feb. 2017, pp. 1-8.
"Office Action of Taiwan Counterpart Application," dated Jan. 9, 2018, p. 1-p. 6, in which the listed references were cited.

\* cited by examiner

CHIP-TO-CHIP SIGNAL TRANSMISSION SYSTEM AND METHOD FOR ARRANGING CHIPS THEREOF

CROSS-REFERENCE TO RELATED APPLICATION

This application claims the priority benefit of Taiwan application serial no. 106111496, filed on Apr. 6, 2017. The entirety of the above-mentioned patent application is hereby incorporated by reference herein and made a part of specification.

BACKGROUND OF THE INVENTION

Field of the Invention

The invention relates to a signal transmission technique, and particularly relates to a chip-to-chip signal transmission system and a method for arranging chips thereof.

Description of Related Art

Along with miniaturization and cost reduction of electronic products, miniaturization and (three-dimensional) 3D stacking package of IC chips have become an important trend in development of semiconductor technique, so that 3D IC stacking technique draws attention of all parties. 3D IC is to vertically stack a plurality of chips in a 3D space, so as to achieve an optimal effect of size reduction. In a method for integrating signal transmission between the stacked chips, a capacitive coupling interconnection technique is one of wireless chip-to-chip connection techniques.

The capacitive coupling interconnection technique transfers signal from one chip to an adjacent chip through capacitive coupling without using a physical line to implement transmission. The capacitive coupling interconnection is mainly implemented through alternating current (AC) coupled interconnection (ACCI), which does not need connection of a direct current (DC) electrical component in case of a high frequency transmission, and only a good AC connection is required to implement the signal transmission. Moreover, a circuit design of a transmitting end of a capacitive coupling chip is relatively simple, only enough driving is required, and a required coupling capacitance area is small, which is adapted to integration of a plurality of chips.

In case of high-speed signal transmission, a capacitive coupling channel is subjected to a crosstalk interference of neighbouring signals and an electromagnetic interference. However, regarding a non-contact capacitive coupling system, metal pads are, for example, used as a transmitting end and a receiving end in circuit design, and when a signal is transmitted from the transmitting end to the receiving end, a face-to-face communication transmission between the transmitting end and the receiving end probably complicates and aggravates the signal interferences in case of misalignment, and during the signal transmission, the signal interference is different along with different position placements, and in order to effectively mitigate the signal interference to achieve the optimal transmission effect, it is important to seek optimization of capacitive coupling placement of the chips.

SUMMARY OF THE INVENTION

The invention is directed to a chip-to-chip signal transmission system and a method for arranging chips thereof, which not only have a good transmission effect, but also effectively mitigates signal interference and attenuation, so as to improve signal transmission quality.

An embodiment of the invention provides a chip-to-chip signal transmission system including a first unit set and a second unit set. The first unit set includes a first transmitting unit set used for transmitting an input signal and disposed on a surface of a first chip, and a first receiving unit set used for receiving the input signal from the first transmitting unit set and disposed on a surface of a second chip corresponding to the first transmitting unit set, where the second chip is disposed opposite to the first chip. The second unit set is disposed adjacent to the first unit set along a first direction, and includes a second transmitting unit set and a second receiving unit set. The second transmitting unit set is disposed on the surface of the first chip for transmitting another input signal, and the second receiving unit set is disposed on the surface of the second chip corresponding to the second transmitting unit set, and receives the another input signal from the second transmitting unit set, where the first unit set and the second unit set have a shift distance in a second direction, the second direction is different to the first direction, the shift distance is greater than 0 μm, and the first unit set and the second unit set form an overlapping region at a junction of projections thereof in the second direction.

An embodiment of the invention provides a method for arranging chips, which is adapted to signal transmission between the chips, and the method includes following steps. A first transmitting unit set and a second transmitting unit set are disposed adjacent to each other on a surface of a first chip along a first direction, where the first transmitting unit set is used for transmitting an input signal, and the second transmitting unit set is used for transmitting another input signal; a first receiving unit set and a second receiving unit set are respectively disposed on a surface of a second chip corresponding to the first transmitting unit set and the second transmitting unit set, where the first receiving unit set receives the input signal from the first transmitting unit set, and the second receiving unit set receives the another input signal from the second transmitting unit set, the second chip is disposed opposite to the first chip, and the first transmitting unit set and the second transmitting unit set have a shift distance in the second direction, the second direction is different to the first direction, the shift distance is greater than 0 μm, and the first transmitting unit set and the second transmitting unit set form an overlapping width at a junction of projections thereof in the second direction.

According to the above description, in the chip-to-chip signal transmission system and the method for arranging chips thereof, the first unit set and the second unit set have the shift distance in the second direction, so that the first unit set and the second unit set are staggered in the second direction, and the first unit set and the second unit set form an overlapping region at a junction of the projections thereof in the second direction. By adjusting the size of the overlapping region of the first unit set and the second unit set, signal transmission interference and signal attenuation caused by misalignment of the chips or the electromagnetic interference of the adjacent signals are decreased, so as to improve the signal transmission quality.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1A:
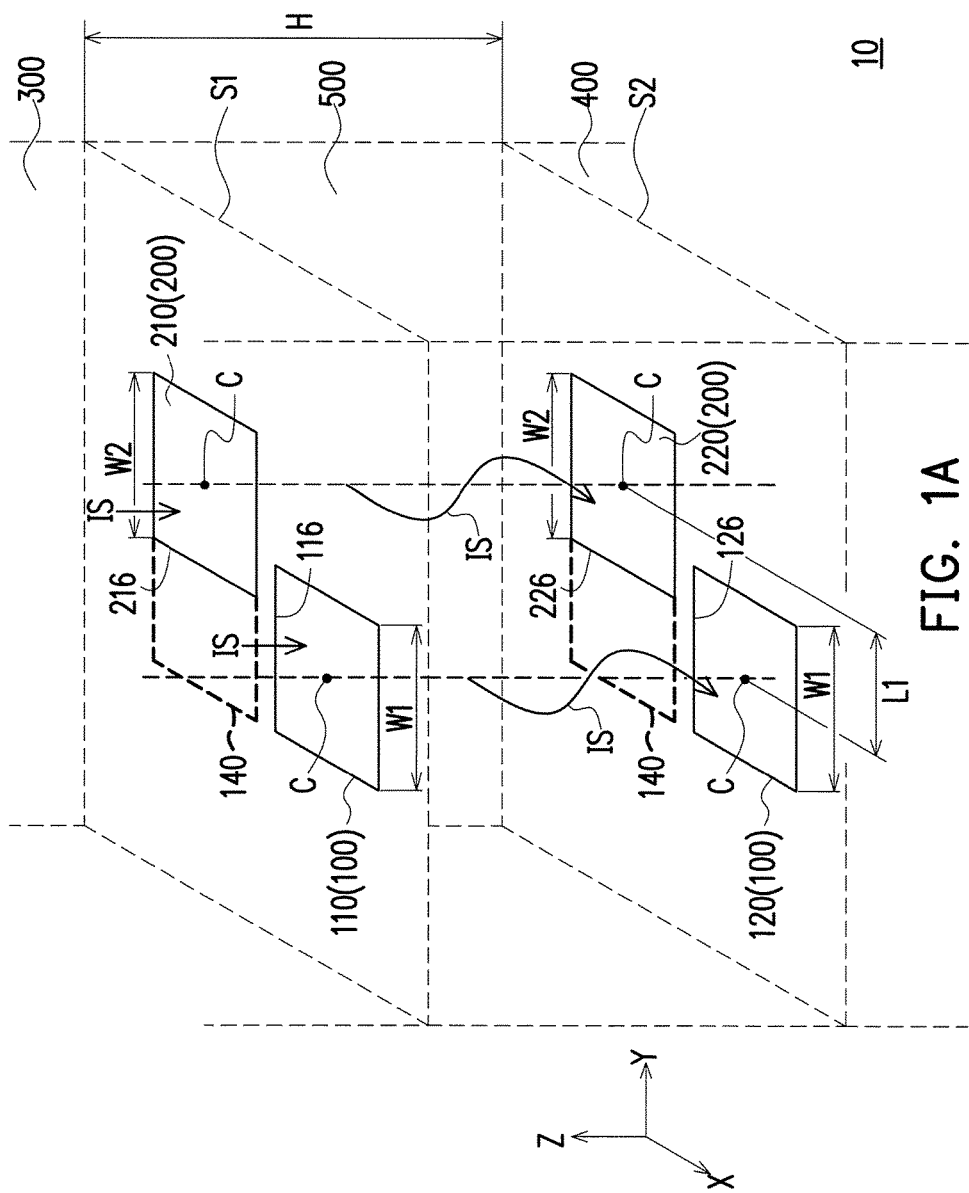
FIG. 1A is a structural schematic diagram of a chip-to-chip signal transmission system according to an embodiment of the invention.

The present invention will now be described more fully with reference to the accompanying drawings, in which exemplary embodiments of the invention are shown. The terms used herein such as "above", "below", "front", "back", "left" and "right" are for the purpose of describing directions in the figures only and are not intended to be limiting of the invention. Moreover, wherever possible, components/members/steps using the same referential numbers in the drawings and description refer to the same or like parts. Components/members/steps using the same referential numbers or using the same terms in different embodiments may cross-refer related descriptions.

Figure 1B:
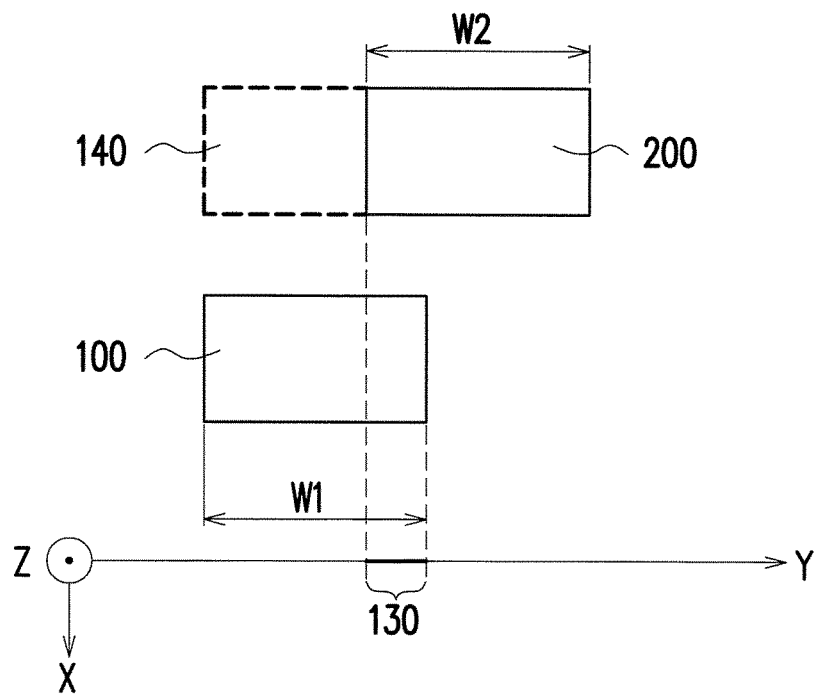
FIG. 1B and FIG. 1C are schematic diagrams of different angles of the chip-to-chip signal transmission system according to the embodiment of FIG. 1A.
Figure 1C:
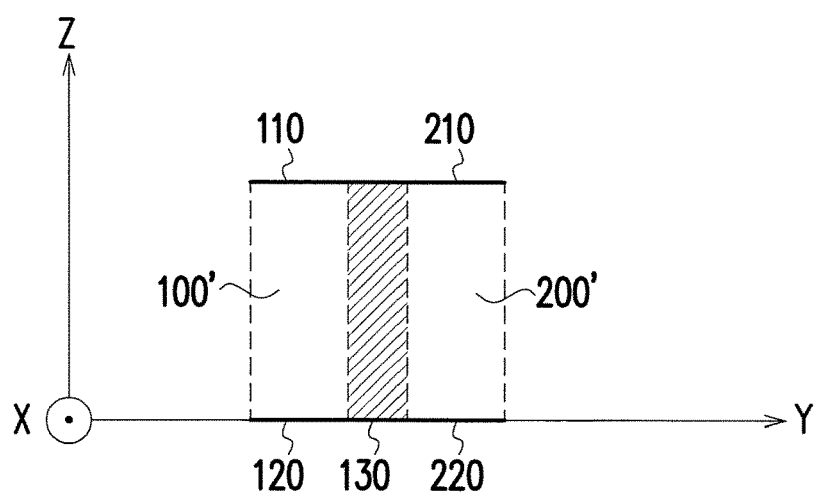

FIG. 1A to FIG. 1C are structural schematic diagrams of a chip-to-chip signal transmission system according to an embodiment of the invention. Referring to FIG. 1A, the chip-to-chip signal transmission system 10 includes a first unit set 100 and a second unit set 200 to provide a function of transmitting signals between a first chip 300 and a second chip 400, where the transmitted signals are, for example, differential signals. The first unit set 100 includes a first transmitting unit set 110 and a first receiving unit set 120, and the second unit set 200 includes a second transmitting unit set 210 and a second receiving unit set 220. The first transmitting unit set 110 and the second transmitting unit set 210 are, for example, disposed on a surface S1 of the first chip 300 to respectively transit an input signal IS. The first receiving unit set 120 receives the input signal IS from the first transmitting unit set 110, and the second receiving unit set 220 receives another input signal IS from the second transmitting unit set 210. In order to receive the input signals IS, the first receiving unit set 120 and the second receiving unit set 220 may be respectively disposed on a surface S2 of the second chip 400 corresponding to the first transmitting unit set 110 and the second transmitting unit set 210.

The second chip 400 is disposed opposite to the first chip 300, in the present embodiment, the second chip 400 is disposed under the first chip 300, and the surface S1 and the surface S2 are respectively two opposite surfaces of the first chip 300 and the second chip 400. A dielectric layer 500 is located between the first chip 300 and the second chip 400, such that the first chip 300 and the second chip 400 have a height H there between.

After the first transmitting unit set 110 and the second transmitting unit set 210 receive the input signals IS, the first transmitting unit set 110 and the second transmitting unit set 210 may respectively transmit the input signals IS to the first receiving unit set 120 and the second receiving unit set 220 through a capacitive coupling effect. For example, the first receiving unit set 120 and the second receiving unit set 220 are respectively disposed right below the first transmitting unit set 110 and the second transmitting unit set 210.

In other words, the first chip 300 and the second chip 400 are stacked in a face-to-face manner, and respectively use the transmitting unit sets 110, 210 disposed on the surface S1 of the first chip 300 and the receiving unit sets 120, 220 disposed on the surface S2 of the second chip 400 to transmit the input signals IS from the first chip 300 to the second chip 400 through the capacitive coupling effect.

In the present embodiment, the second unit set 200 is, for example, disposed adjacent to the first unit set 100 along a first direction, and the first unit set 100 and the second unit set 200 have a shift distance in a second direction, where the first direction and the second direction are, for example, parallel to the surface S1 or the surface S2, and the second direction is different to the first direction, for example, the second direction is perpendicular to the first direction. In the following description the first direction is, for example, an X-direction, and the second direction is a Y-direction. For example, in FIG. 1A, the first unit set 100 and the second unit set 200 are disposed adjacent to each other in the X-direction, and have a shift distance L1 in the Y-direction, where the shift distance L1 may be defined as a distance between a geometric center C of the first unit set 100 and a geometric center C of the second unit set 200 in the Y direction, though the definition of the shift distance is not limited by the invention.

In case that the shift distance L1 is greater than 0 the first unit set 100 and the second unit set 200 are staggered in the Y-direction, such that the sides of the first unit set 100 and the second unit set 200 located adjacent to each other and unparallel to each other may encircle a retaining space 140, for example, a side 116 of the first transmitting unit set 110 and a side 216 of the second transmitting unit set 210 or a side 126 of the first receiving unit set 120 and a side 226 of the second receiving unit set 220. The retaining space 140 can be defined as an overlapping region of a projection of the first unit set 100 in the Y-direction and a projection of the second unit set 200 in the X-direction, which is not limited by the invention.

Comparatively, as the first unit set 100 and the second unit set 200 are staggered in the Y-direction, not only the retaining space 140 is formed, an overlapping region 130 is also formed. Referring to FIG. 1B and FIG. 1C, FIG. 1B and FIG. 1C are schematic diagrams of different angles of the chip-to-chip signal transmission system of FIG. 1A. A width of the first unit set 100 in the Y-direction is W1 and a width of the second unit set 200 in the Y-direction is W2. Since the shift distance of the second unit set 200 relative to the first unit set 100 in the Y-direction is L1, when the shift distance L1 is greater than 0 μm, and is smaller than ½ of a width summation (W1+W2) of the first unit set 100 and the second unit set 200 in the Y-direction, the first unit set 100 and the second unit set 200 may form the overlapping region 130 at a junction of the projections thereof in the Y-direction, and when the shift distance L1 is greater than or equal to ½ of the width summation (W1+W2) of the first unit set 100 and the second unit set 200 in the Y-direction, the first unit set 100 and the second unit set 200 are completely staggered in the Y-direction, and an area of the overlapping region 130 is 0. Namely, referring to FIG. 1C, a projection of the first unit set 100 in the Y-direction is 100', a projection of the second unit set 200 in the Y-direction is 200', and the projection 100' and the projection 200' form the overlapping region 130 at a junction thereof in the Y-direction, and a proportion of the area of the overlapping region 130 to the maximum one of the areas of the projections 100' and 200' is greater than or equal to 0% and is smaller than 100%.

In the present embodiment, the shift distance of the first unit set 100 and the second unit set 200 in the Y-direction is L1, such that the first unit set 100 and the second unit set 200 are staggered in the Y-direction, and by adjusting a size of the overlapping region 130 of the first unit set 100 and the second unit set 200, the signal transmission interference and signal attenuation caused by misalignment of the chips or the neighbor crosstalk from adjacent transmission units are decreased, so as to improve the signal transmission quality.

Figure 2A:
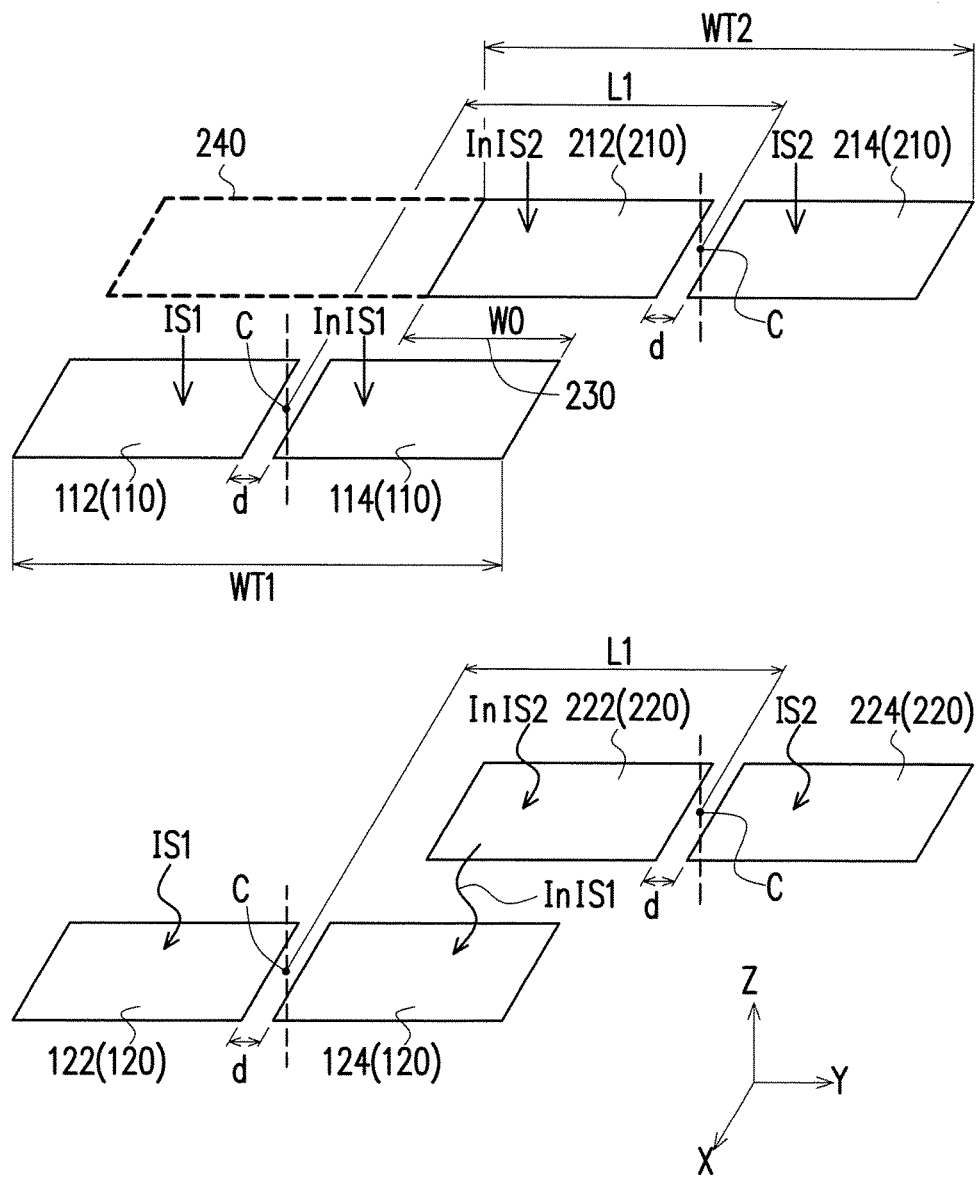
FIG. 2A is a structural schematic diagram of a chip-to-chip signal transmission system according to an embodiment of the invention.

To be specific, referring to FIG. 2A, FIG. 2A is a structural schematic diagram of a chip-to-chip signal transmission system according to an embodiment of the invention. In the present embodiment, the first transmitting unit set 110 includes a first transmitting unit 112 and a second transmitting unit 114, where the first transmitting unit 112 and the second transmitting unit 114 are arranged on the surface S1 by neighboring to each other along the Y-direction, and have a gap d there between along the Y-direction; the second transmitting unit set 210 includes a third transmitting unit 212 and a fourth transmitting unit 214, where the third transmitting unit 212 and the fourth transmitting unit 214 are arranged on the surface S1 by neighboring to each other along the Y-direction, and have the gap d there between along the Y-direction. The first receiving unit set 120 includes a first receiving unit 122 and a second receiving unit 124, where the first receiving unit 122 and the second receiving unit 124 respectively correspond to the configuration relationship of the first transmitting unit 112 and the second transmitting unit 114. For example, the first receiving unit 122 and the second receiving unit 124 are arranged on the surface S2 by neighboring to each other under the first transmitting unit 112 and the second transmitting unit 114 along the Y-direction. Similarly, the second receiving unit set 220 includes a third receiving unit 222 and a fourth receiving unit 224, where the third receiving unit 222 and the fourth receiving unit 224 respectively correspond to the configuration relationship of the third transmitting unit 212 and the fourth transmitting unit 214. For example, the third receiving unit 222 and the fourth receiving unit 224 are arranged on the surface S2 by neighboring to each other under the third transmitting unit 212 and the fourth transmitting unit 214 along the Y-direction.

The first to the fourth transmitting units 112, 114, 212 and 214 and the first to the fourth receiving units 122, 124, 222 and 224 are, for example, metal pads, and may serve as electrodes of capacitors, such that the input signals can be transmitted from the transmitting units to the corresponding receiving units in the non-contact capacitive coupling manner without using physical lines. Particularly, the transmitting units 112, 114, 212 and 214 and the receiving units 122, 124, 222 and 224 are all, for example, rectangular metal pads, and sizes of the corresponding transmitting unit and the receiving unit are the same, and the sides of each of the aforementioned transmitting units and the receiving units arranged along the Y-direction are parallel to the Y-direction, though implementations of materials, shapes or arranging directions of the transmitting units or the receiving units are not limited by the invention.

In the present embodiment, the chip-to-chip signal transmission system 20 is based on a side differential configuration, and the input signals IS in FIG. 1A are respectively a set of differential signals in the present embodiment. The input signal IS includes a first input signal IS1 and an inverted signal InIS1 inverted to the first input signal IS1, and another input signal IS includes a second input signal IS2 and an inverted signal InIS2 inverted to the second input signal IS2. To be specific, in the first unit set 100, the first transmitting unit 112 receives the first input signal IS1, and transmits the first input signal IS1 to the first receiving unit 122. On the other hand, the second transmitting unit 114 receives the inverted signal InIS1 of the first input signal IS1, i.e. the first inverted signal InIS1, which has the same amplitude and a reverse phase with that of the first input signal IS1. The second receiving unit 124 receives the first inverted signal InIS1 from the second transmitting unit 114 through the capacitive coupling manner.

The second unit set 200 also has the similar structure, and since the second unit set 200 is disposed adjacent to the first unit set 100 in the X-direction, in order to reduce the electromagnetic interference of the adjacent unit set, configuration of positive and negative terminals of the transmitting units 212 and 214 of the second unit set 200 used for receiving the second input signal IS2 can be opposite to that of the first unit set 100. For example, the third transmitting unit 212 receives the inverted signal InIS2 of the second input signal IS2, i.e. the second inverted signal InIS2, which has the same amplitude and a reverse phase with that of the second input signal IS2, and the third transmitting unit 212 transmits the second inverted signal InIS2 to the third receiving unit 222. On the other hand, the fourth transmitting unit 214 transmits the second input signal IS2 to the fourth receiving unit 224 through the capacitive coupling manner.

In the present embodiment, the first transmitting unit set 110 and the second transmitting unit set 210 have the shift distance L1 in the Y-direction, where the shift distance L1 is, for example, defined as a distance between a geometric center C of the first transmitting unit set 110 and a geometric center C of the second transmitting unit set 210 in the Y direction. The first transmitting unit set 110 and the second transmitting unit set 210 are staggered in the Y-direction due to the shift distance L1 to form a retaining space 240. For example, the sides of the first transmitting unit 112 and the second transmitting unit 114 located adjacent to the transmitting unit set 210 and arranged in parallel with the Y-direction and the side of the third transmitting unit 212 located adjacent to the first transmitting unit set 110 and parallel to the X-direction encircle the retaining space 240.

Besides, the second transmitting unit 114 and the third transmitting unit 212 can be disposed between the first transmitting unit 112 and the fourth transmitting unit 214 in the Y-direction, and the receiving units corresponding to the transmitting units also have the similar configuration relationship, for example, the second receiving unit 124 and the third receiving unit 222 are disposed between the first receiving unit 122 and the fourth receiving unit 224 in the Y-direction.

A width of the first transmitting unit set 110 in the Y-direction is, for example, WT1, and a width of the second transmitting unit set 210 in the Y-direction is, for example, WT2. The first transmitting unit set 110 and the second transmitting unit set 210 may form an overlapping region 230 with a width WO at a junction of projections thereof in the Y-direction, where a proportion of the overlapping width WO relative to the maximum one of the width WT1 and the width WT2 is f, and the proportion f is greater than or equal to 0% and is smaller than 100%. Moreover, the shift distance L1 can be greater than 0 µm, and smaller than or equal to ½ of a sum of the width WT1 of the first transmitting unit set 110 and the width WT2 of the second transmitting unit set 210.

Figure 2B:
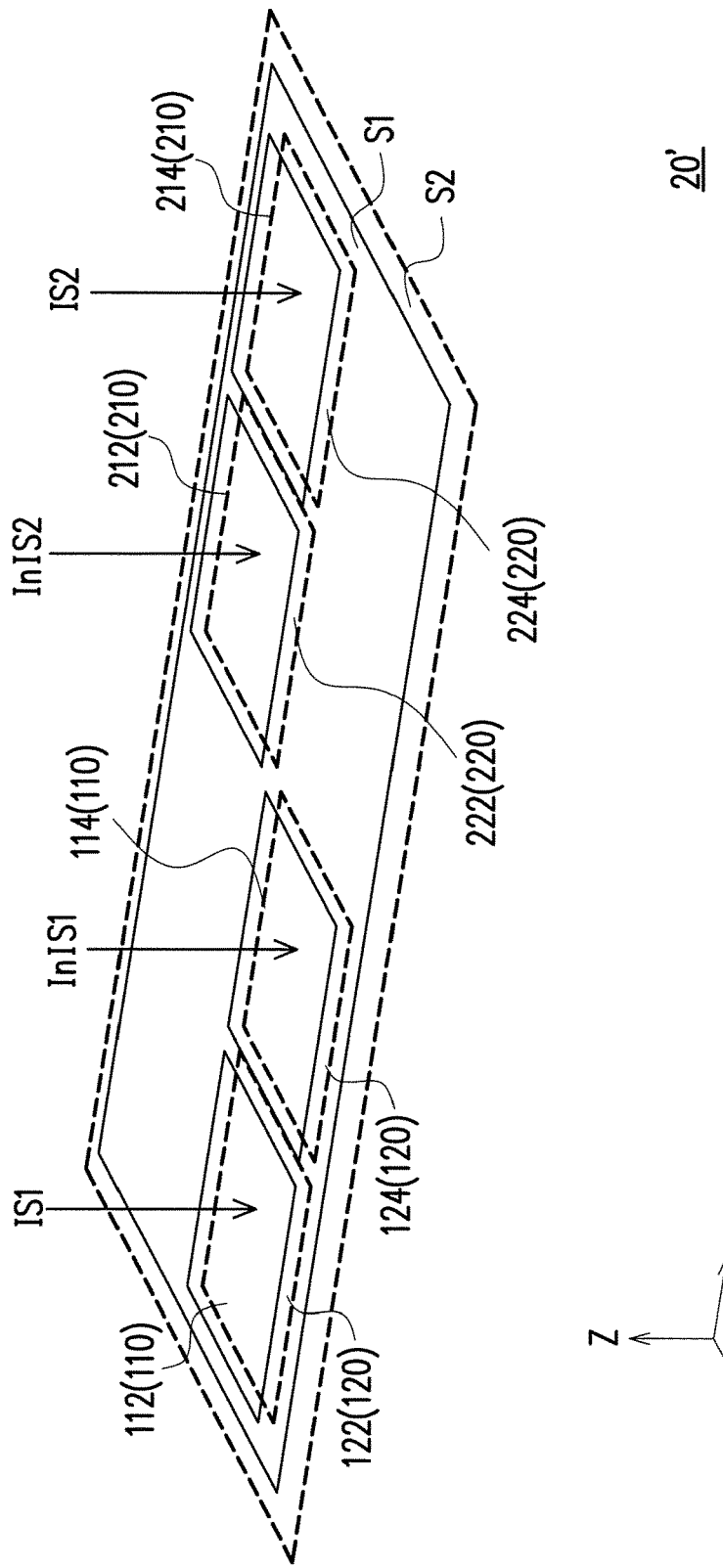
FIG. 2B is a structural schematic diagram of a chip-to-chip signal transmission system according to the embodiment of FIG. 2A.

Referring to FIG. 1C and FIG. 2B, FIG. 2B is a structural schematic diagram of a chip-to-chip signal transmission system according to the embodiment of FIG. 2A. The chip-to-chip signal transmission system 20' of FIG. 2B presents a situation that the first unit set 100 and the second unit set 200 are completely staggered in the Y-direction, and a proportion of the area of the overlapping region 130 relative to the maximum one of the areas of the projection 100' and the projection 200' is 0%, and the overlapping width WO is 0 µm. It should be noted that in the present embodiment, since the transmitting units and the receiving units have the same size and are aligned along a vertical direction, an overlapping proportion of the overlapping region 130 is consistent with the proportion f of the overlapping width WO between the first transmitting unit set 110 and the second transmitting unit set 210 relative to the maximum one of the width WT1 and the width WT2, i.e. the proportion f is also 0%.

An optimal proportion of the overlapping width WO to the maximum one of the widths of the transmitting unit set 110 and 210 in the Y-direction is related to a magnitude of the gap d. When the gap d is greater than or equal to 5 µm and smaller than or equal to 20 µm, preferably, the proportion f ranges between 55% and 75%, and more preferably, the proportion f ranges between 55% and 65%.

Figure 2C:
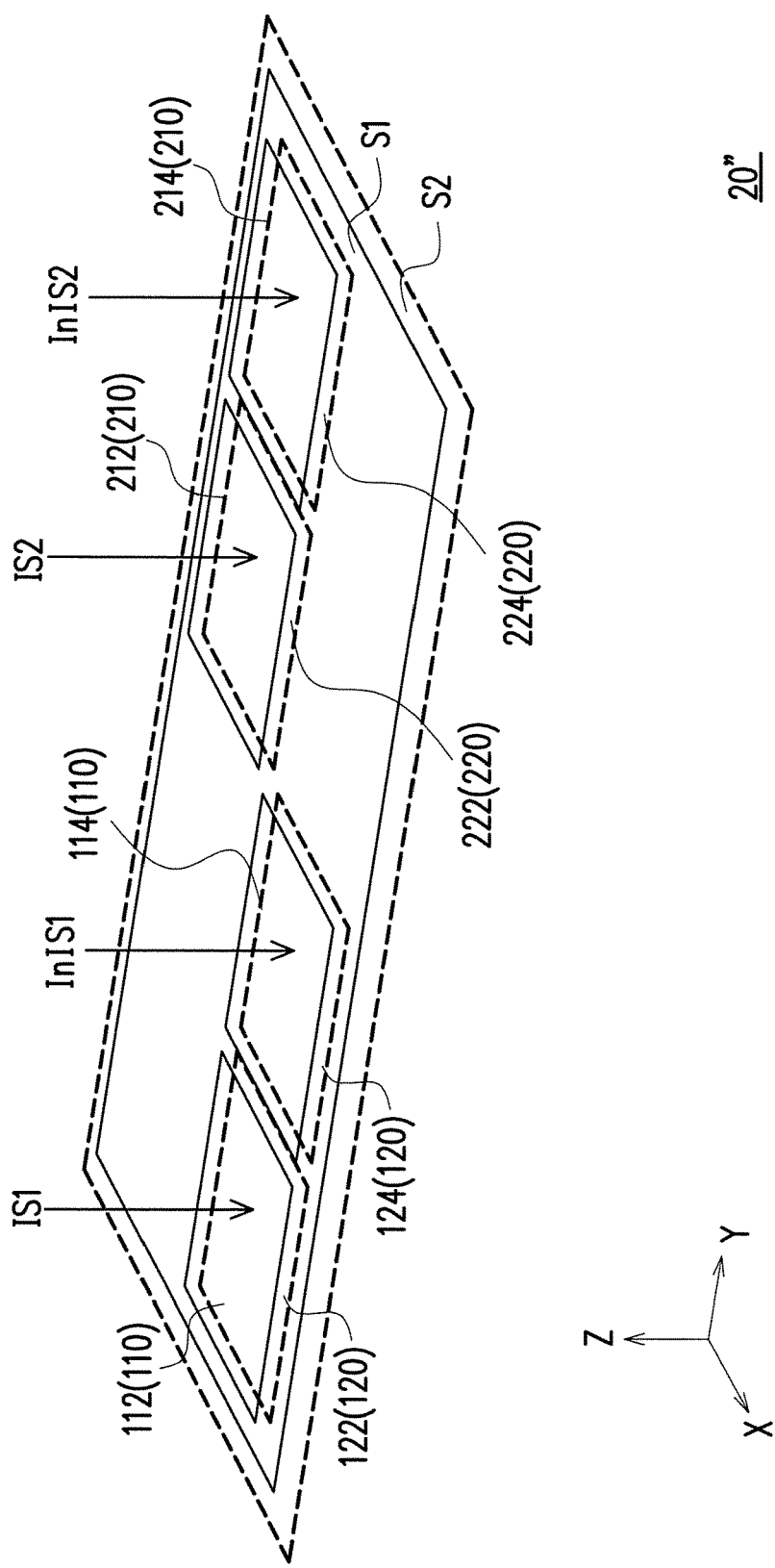
FIG. 2C is a structural schematic diagram of a chip-to-chip signal transmission system according to another embodiment of the invention.

FIG. 2C is a structural schematic diagram of a chip-to-chip signal transmission system according to another embodiment of the invention. An input signal configuration of the chip-to-chip signal transmission system of the invention is not limited to the side differential manner, and a structure detail, a configuration relationship and an implementation method of the chip-to-chip signal transmission system 20" of FIG. 2C are the same or similar to that of the embodiments of FIG. 1A to FIG. 2B, so that enough instructions and recommendations, implementation descriptions may be learned from the descriptions of the chip-to-chip signal transmission systems 10, 20, 20' of the embodiments of FIG. 1A to FIG. 2B, and details thereof are not repeated. A main difference there between is a configuration method of the input signals IS of the second unit set 200.

In the present embodiment, the configuration method of the input signals IS of the first unit set 100 is the same with that of the embodiment of FIG. 2A and FIG. 2B, the first transmitting unit 112 receives the first input signal IS1, and transmits the first input signal IS1 to the first receiving unit 122, and the second transmitting unit 114 receives the first inverted signal InIS1 and transmits the same to the second receiving unit 124 through the capacitive coupling manner. A difference between the present embodiment and the embodiment of FIG. 2A or FIG. 2B is that configuration of positive and negative terminals of the transmitting units 212 and 214 of the second unit set 200 used for receiving the second input signal IS2 is the same with that of the first unit set 100, the third transmitting unit 212 receives the second input signal IS2 and transmits the same to the third receiving unit 222, and the fourth transmitting unit 214 transmits the second inverted signal InIS2 to the fourth receiving unit 224 through the capacitive coupling manner.

Particularly, the chip-to-chip signal transmission systems 20" of FIG. 2C presents a situation that the first unit set 100 and the second unit set 200 are completely staggered in the Y-direction, though the invention is not limited thereto, and the first unit set 100 and the second unit set 200 of the chip-to-chip signal transmission systems 20" can also be partially staggered in the Y-direction, as that shown in FIG. 2A. Moreover, relative sizes of the areas of the surface S1 and the surface S2 of FIG. 2B and FIG. 2C are only an example, which are not limited by the invention.

Figure 3A:
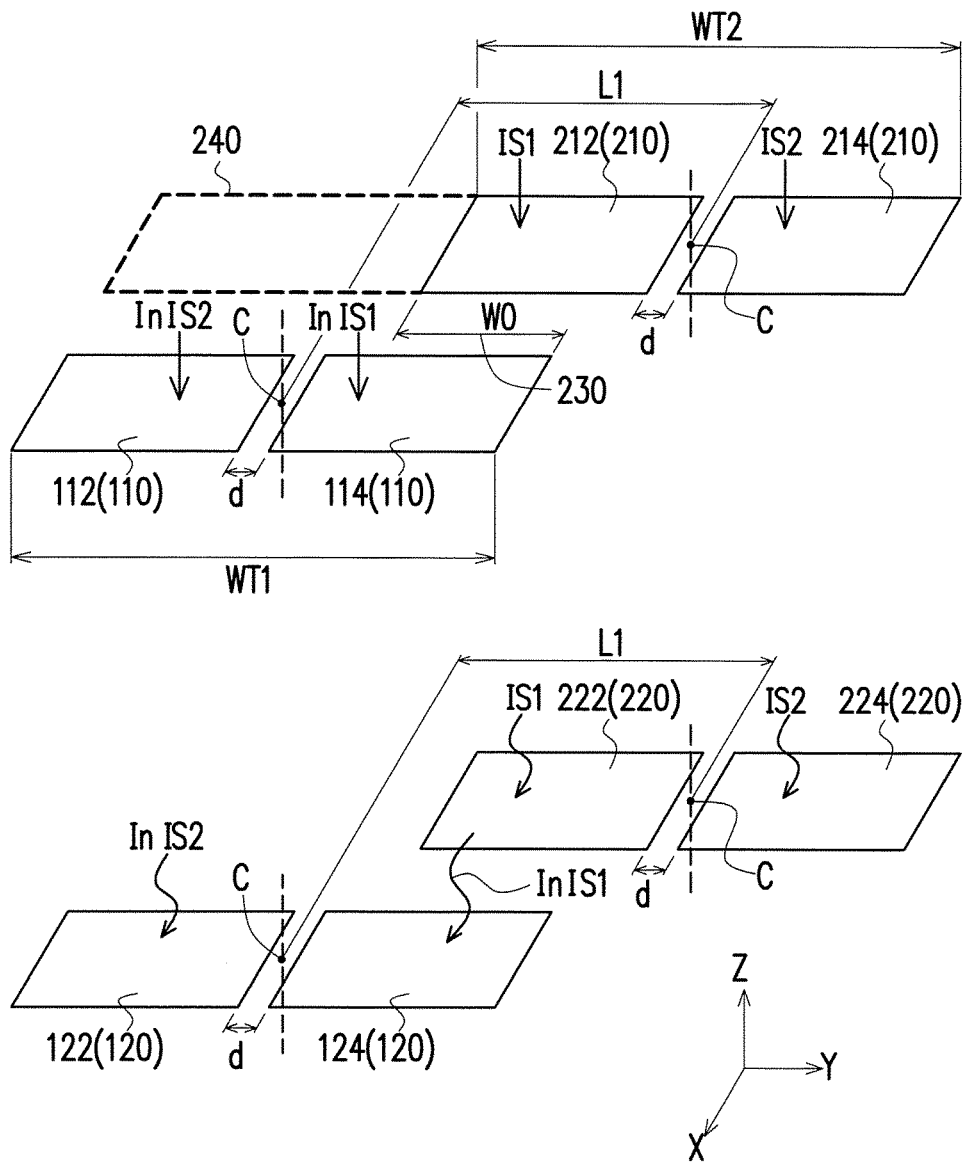
FIG. 3A is a structural schematic diagram of a chip-to-chip signal transmission system according to another embodiment of the invention.

FIG. 3A is a structural schematic diagram of a chip-to-chip signal transmission system according to another embodiment of the invention. A structure detail, a configuration relationship and an implementation method of the chip-to-chip signal transmission system 30 of FIG. 3A are the same or similar to that of the embodiments of FIG. 1A to FIG. 2C, so that enough instructions and recommendations, implementation descriptions may be learned from the descriptions of the chip-to-chip signal transmission systems 10, 20, 20', 20" of the embodiments of FIG. 1A to FIG. 2C, and details thereof are not repeated. A main difference there between is that in the present embodiment, the chip-to-chip signal transmission system 30 is based on a corner differential configuration.

The conventional side differential configuration is to place the differential input terminals (i.e. the positive signal and the inverted signal) side by side, which is easily cause signal distortion due to neighbouring capacitance interference during signal transmission, and the conventional corner differential configuration is to place a pair of differential signals in the staggered arrangement at two sides of a diagonal, which are located close to each other. In comparison with the conventional side differential signaling, the corner differential signaling may mitigate the noise interference between signals.

In the present embodiment, the input signals IS in FIG. 1A is analogous to a mixture of two sets of differential signals in the present embodiment, where the input signal IS received by the first transmitting unit set 110 includes the first inverted signal InIS1 and the second inverted signal InIS2, and another input signal IS received by the second transmitting unit set 210 includes the first input signal IS1 and the second input signal IS2. To be specific, the first transmitting unit 112 receives the second inverted signal InIS2, and transmits the second inverted signal InIS2 to the first receiving unit 122 through the capacitive coupling manner, the second transmitting unit 114 transmits the first inverted signal InIS1 to the second receiving unit 124, the third transmitting unit 212 receives the first input signal IS1 and transmits the same to the third receiving unit 222, and the fourth transmitting unit 214 transmits the second input signal IS2 to the fourth receiving unit 224 through the capacitive coupling manner.

Similarly, the shift distance is L1, so that the first transmitting unit set 110 and the second transmitting unit set 210 may form the overlapping region 230 with a width WO at a junction of projections thereof in the Y-direction, in the present embodiment, when the gap d is greater than or equal to 5 µm and smaller than or equal to 20 µm, preferably, the proportion f is greater than or equal to 60% and smaller than 100%, and more preferably, when the gap d is greater than 10 µm and smaller than or equal to 15 µm, the proportion f ranges between 75% and 85%, or when the gap d is greater than 15 µm and smaller than or equal to 20 µm, the proportion f ranges between 65% and 75%.

Figure 3B:
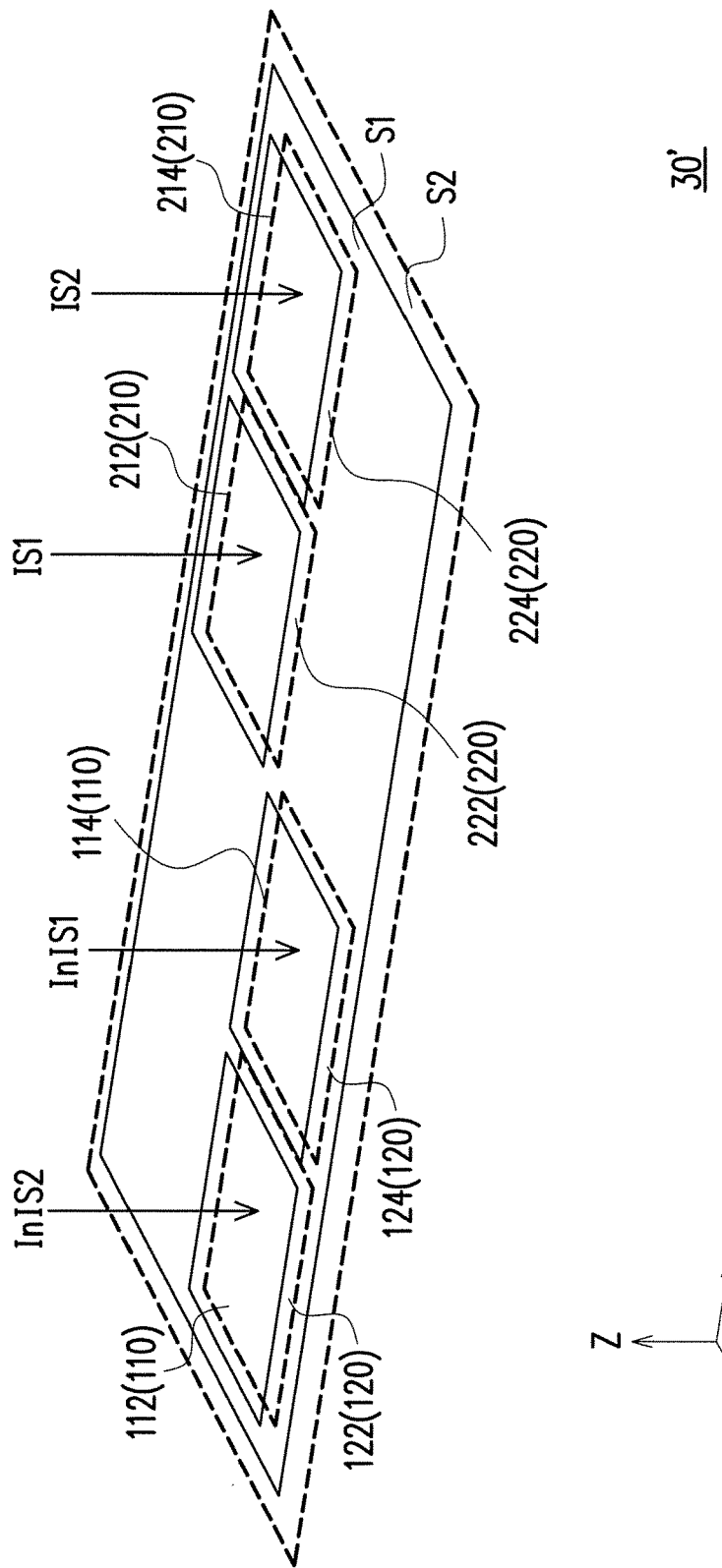
FIG. 3B is a structural schematic diagram of the chip-to-chip signal transmission system according to the embodiment of FIG. 3A.

Referring to FIG. 3B, FIG. 3B is a structural schematic diagram of the chip-to-chip signal transmission system according to the embodiment of FIG. 3A. The chip-to-chip signal transmission systems 30' of FIG. 3B presents a situation that the first unit set 100 and the second unit set 200 are completely staggered in the Y-direction, and now a proportion of the area of the overlapping region 130 to the maximum one of the areas of the projections 100' and 200' is 0%, and the overlapping width WO is 0 μm. It should be noted that in the present embodiment, since the transmitting units and the receiving units have the same size and are vertically aligned, an overlapping proportion of the overlapping region 130 is consistent with the proportion f of the overlapping width WO between the first transmitting unit set 110 and the second transmitting unit set 210 relative to the maximum one of the width WT1 and the width WT2, i.e. the proportion f is also 0%. Moreover, relative sizes of the areas of the surface S1 and the surface S2 of FIG. 2B and FIG. 2C are only an example, which are not limited by the invention.

It should be noted that in the aforementioned description, the shift distance L1 of the first transmitting unit set 110 and the second transmitting unit set 210 in the Y-direction is the same to the shift distance of the first receiving unit set 120 and the second receiving unit set 220 in the Y-direction, though the invention is not limited thereto, and those skilled in the art may make proper adjustment according to an actual demand, i.e. the aforementioned receiving unit and the corresponding transmitting unit may also have a proper shift distance, and enough instructions, recommendations and implementation descriptions for implementation details thereof can be learned from common knowledge of the technical field, and detailed description thereof is not repeated.

Figure 4:
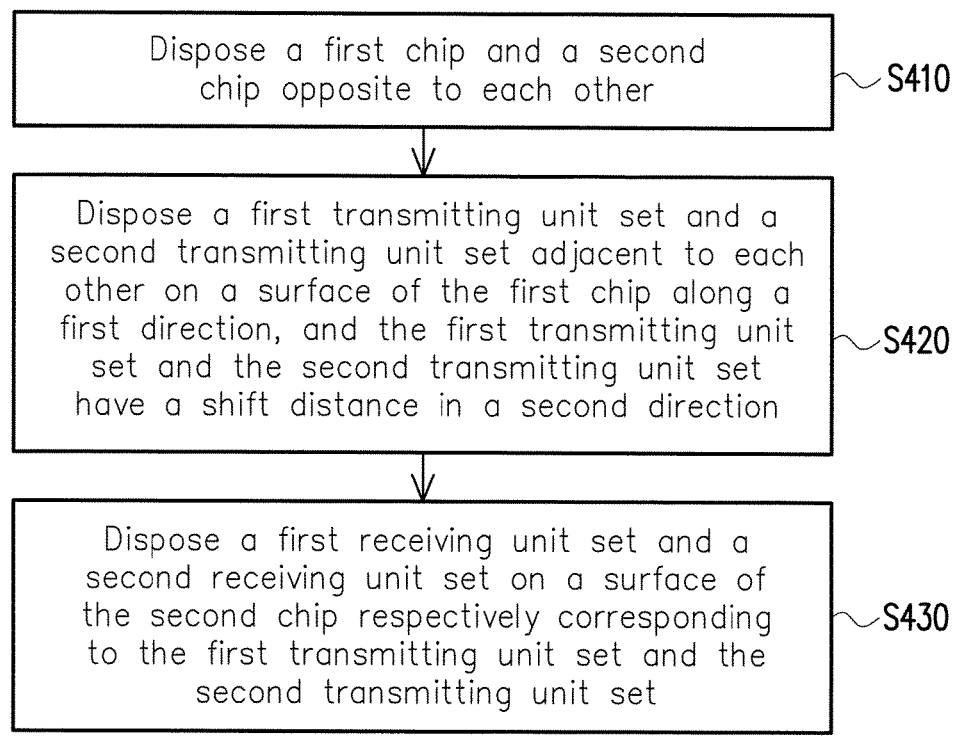
FIG. 4 is a flowchart illustrating a method for arranging chips according to an embodiment of the invention.

FIG. 4 is a flowchart illustrating a method for arranging chips according to an embodiment of the invention. Referring to FIG. 4 with reference of any embodiment of FIG. 1A to FIG. 3B, and the method of the present embodiment is adapted to the chip-to-chip signal transmission systems of FIG. 1A to FIG. 3B. Detailed steps of the method for arranging chips of the present embodiment are described below with reference of various components in the chip-to-chip signal transmission system 10, 20, 20', 20", 30 or 30'. In step S410, a first chip and a second chip are disposed opposite to each other, for example, the first chip and the second chip are stacked in a face-to-face manner. In step S420, a first transmitting unit set and a second transmitting unit set are disposed adjacent to each other on a surface of the first chip along a first direction, and the first transmitting unit set and the second transmitting unit set have a shift distance in a second direction, where the shift distance is greater than 0 μm, such that the second transmitting unit and the first transmitting unit are staggered along the second direction, and the first transmitting unit set and the second transmitting unit set form an overlapping width at a junction of projections thereof in the second direction, where the first direction is different to the second direction, and the first direction and the second direction are, for example, parallel to the surface of the first chip and perpendicular to each other. The first transmitting unit receives an input signal, and the second transmitting unit receives another input signal. In step S430, the first receiving unit set and the second receiving unit set are respectively disposed on a surface of the second chip corresponding to the first transmitting unit set and the second transmitting unit set, where the first transmitting unit set transmit the input signal to the first receiving unit set, and the second transmitting unit set transmits the another input signal to the second receiving unit set, where the surface of the first chip and the surface of the second chip are, for example, two surfaces opposite to each other.

In summary, in the chip-to-chip signal transmission system and the method for arranging chips thereof, the first unit set and the second unit set have the shift distance in the second direction, so that the first unit set and the second unit are staggered in the second direction, and the first unit set and the second unit set form an overlapping region at a junction of the projections thereof in the second direction. By adjusting the size of the overlapping region of the first unit set and the second unit set, signal transmission interference and signal attenuation caused by misalignment of the chips or the electromagnetic interference of the adjacent signals are decreased, so as to improve the signal transmission quality.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A chip-to-chip signal transmission system, comprising:
 a first unit set, comprising:
   a first transmitting unit set, disposed on a surface of a first chip, and configured to transmit an input signal; and
   a first receiving unit set, disposed on a surface of a second chip corresponding to the first transmitting unit set, and configured to receive the input signal from the first transmitting unit set, wherein the second chip is disposed opposite to the first chip; and
 a second unit set, disposed adjacent to the first unit set along a first direction, and comprising:
   a second transmitting unit set, disposed on the surface of the first chip, and configured to transmit another input signal; and
   a second receiving unit set, disposed on the surface of the second chip corresponding to the second transmitting unit set, and receiving the another input signal from the second transmitting unit set,
   wherein the first unit set and the second unit set have a shift distance in a second direction, the second direction is different to the first direction, the shift distance is greater than 0 μm, and the first unit set and the second unit set form an overlapping region at a junction of projections thereof in the second direction, wherein
  the first transmitting unit set comprises a first transmitting unit and a second transmitting unit, the first transmitting unit and the second transmitting unit are arranged adjacent to each other along the second direction;
  the first receiving unit set comprises a first receiving unit and a second receiving unit, the first receiving unit and the second receiving unit respectively correspond to a configuration relationship of the first transmitting unit and the second transmitting unit, and are arranged adjacent to each other along the second direction;
  the second transmitting unit set comprises a third transmitting unit and a fourth transmitting unit, the third transmitting unit and the fourth transmitting unit are arranged adjacent to each other along the second direction; and
  the second receiving unit set comprises a third receiving unit and a fourth receiving unit, the third receiving unit and the fourth receiving unit respectively correspond to a configuration relationship of the third transmitting unit and the fourth transmitting unit, and are arranged adjacent to each other along the second direction, wherein the second transmitting unit and the third transmitting unit are disposed between the first transmitting unit and the fourth transmitting unit in the second direction, and the second receiving unit and the third receiving unit are disposed between the first receiving unit and the fourth receiving unit in the second direction, wherein the input signal comprises a first input signal and an inverted signal of the first input signal, the another input signal comprises a second input signal and an inverted signal of the second input signal, the first transmitting unit transmits the first input signal to the first receiving unit, the second transmitting unit transmits the inverted signal of the first input signal to the second receiving unit, the fourth transmitting unit transmits the second input signal to the fourth receiving unit, and the third transmitting unit transmits the inverted signal of the second input signal to the third receiving unit.

2. The chip-to-chip signal transmission system as claimed in claim 1, wherein a proportion of an area of the overlapping region to a maximum one of projection areas of the first unit set and the second unit set in the second direction is greater than or equal to 0% and smaller than 100%.

3. The chip-to-chip signal transmission system as claimed in claim 1, wherein sides of the first transmitting unit, the second transmitting unit, the third transmitting unit, the fourth transmitting unit, the first receiving unit, the second receiving unit, the third receiving unit and the fourth receiving unit, which are arranged along the second direction, are parallel to the second direction.

4. The chip-to-chip signal transmission system as claimed in claim 1, wherein there is a gap between the first transmitting unit and the second transmitting unit in the second direction, and there is the gap between the third transmitting unit and the fourth transmitting unit in the second direction, wherein the first transmitting unit set and the second transmitting unit set form an overlapping width at a junction of projections thereof in the second direction, and a proportion of the overlapping width relative to the maximum one of projection widths of the first transmitting unit set and the second transmitting unit set in the second direction is f, wherein the gap is greater than or equal to 5 µm and smaller than or equal to 20 µm, and the proportion f is greater than or equal to 55% and smaller than or equal to 75%.

5. The chip-to-chip signal transmission system as claimed in claim 1, wherein the shift distance is defined as a distance between a geometric center of the first unit set and a geometric center of the second unit set in the second direction, the shift distance is greater than 0 µm and smaller than or equal to ½ of a width summation of the first unit set and the second unit set in the second direction.

6. A chip-to-chip signal transmission system, comprising:
a first unit set, comprising:
a first transmitting unit set, disposed on a surface of a first chip, and configured to transmit an input signal; and
a first receiving unit set, disposed on a surface of a second chip corresponding to the first transmitting unit set, and configured to receive the input signal from the first transmitting unit set, wherein the second chip is disposed opposite to the first chip; and
a second unit set, disposed adjacent to the first unit set along a first direction, and comprising:

a second transmitting unit set, disposed on the surface of the first chip, and configured to transmit another input signal; and
a second receiving unit set, disposed on the surface of the second chip corresponding to the second transmitting unit set, and receiving the another input signal from the second transmitting unit set,
wherein the first unit set and the second unit set have a shift distance in a second direction, the second direction is different to the first direction, the shift distance is greater than 0 µm, and the first unit set and the second unit set form an overlapping region at a junction of projections thereof in the second direction, wherein the first transmitting unit set comprises a first transmitting unit and a second transmitting unit, the first transmitting unit and the second transmitting unit are arranged adjacent to each other along the second direction;

the first receiving unit set comprises a first receiving unit and a second receiving unit, the first receiving unit and the second receiving unit respectively correspond to a configuration relationship of the first transmitting unit and the second transmitting unit, and are arranged adjacent to each other along the second direction;

the second transmitting unit set comprises a third transmitting unit and a fourth transmitting unit, the third transmitting unit and the fourth transmitting unit are arranged adjacent to each other along the second direction; and the second receiving unit set comprises a third receiving unit and a fourth receiving unit, the third receiving unit and the fourth receiving unit respectively correspond to a configuration relationship of the third transmitting unit and the fourth transmitting unit, and are arranged adjacent to each other along the second direction, wherein the second transmitting unit and the third transmitting unit are disposed between the first transmitting unit and the fourth transmitting unit in the second direction, and the second receiving unit and the third receiving unit are disposed between the first receiving unit and the fourth receiving unit in the second direction, wherein the input signal comprises an inverted signal of a first input signal and an inverted signal of a second input signal, the another input signal comprises the first input signal and the second input signal, the first transmitting unit transmits the inverted signal of the second input signal to the first receiving unit, the second transmitting unit transmits the inverted signal of the first input signal to the second receiving unit, the third transmitting unit transmits the first input signal to the third receiving unit, and the fourth transmitting unit transmits the second input signal to the fourth receiving unit.

7. The chip-to-chip signal transmission system as claimed in claim 6, wherein there is a gap between the first transmitting unit and the second transmitting unit in the second direction, and there is the gap between the third transmitting unit and the fourth transmitting unit in the second direction, wherein the first transmitting unit set and the second transmitting unit set form an overlapping width at a junction of projections thereof in the second direction, and a proportion of the overlapping width relative to the maximum one of projection widths of the first transmitting unit set and the second transmitting unit set in the second direction is f, wherein the gap is greater than or equal to 5 µm and smaller than or equal to 20 µm, and the proportion f is greater than or equal to 60% and smaller than 100%.

8. A method for arranging chips, adapted to signal transmission between the chips, and the method for arranging chips comprising:

disposing a first transmitting unit set and a second transmitting unit set adjacent to each other on a surface of a first chip along a first direction, wherein the first transmitting unit set is configured to transmit an input signal, and the second transmitting unit set is configured to transmit another input signal;

disposing a first receiving unit set and a second receiving unit set on a surface of a second chip respectively corresponding to the first transmitting unit set and the second transmitting unit set, wherein the first receiving unit set receives the input signal from the first transmitting unit set, and the second receiving unit set receives the another input signal from the second transmitting unit set, and the second chip is disposed opposite to the first chip, wherein the first transmitting unit set and the second transmitting unit set have a shift distance in a second direction, the second direction is different to the first direction, the shift distance is greater than 0 µm, and the first transmitting unit set and the second transmitting unit set form an overlapping width at a junction of projections thereof in the second direction, wherein the first transmitting unit set comprises a first transmitting unit and a second transmitting unit, the first transmitting unit and the second transmitting unit are arranged adjacent to each other along the second direction;

the first receiving unit set comprises a first receiving unit and a second receiving unit, the first receiving unit and the second receiving unit respectively correspond to a configuration relationship of the first transmitting unit and the second transmitting unit, and are arranged adjacent to each other along the second direction;

the second transmitting unit set comprises a third transmitting unit and a fourth transmitting unit, the third transmitting unit and the fourth transmitting unit are arranged adjacent to each other along the second direction; and the second receiving unit set comprises a third receiving unit and a fourth receiving unit, the third receiving unit and the fourth receiving unit respectively correspond to a configuration relationship of the third transmitting unit and the fourth transmitting unit, and are arranged adjacent to each other along the second direction;

disposing the second transmitting unit and the third transmitting unit between the first transmitting unit and the fourth transmitting unit in the second direction; and disposing the second receiving unit and the third receiving unit between the first receiving unit and the fourth receiving unit in the second direction, wherein the input signal comprises a first input signal and an inverted signal of the first input signal, the another input signal comprises a second input signal and an inverted signal of the second input signal, the first transmitting unit transmits the first input signal to the first receiving unit, the second transmitting unit transmits the inverted signal of the first input signal to the second receiving unit, the fourth transmitting unit transmits the second input signal to the fourth receiving unit, and the third transmitting unit transmits the inverted signal of the second input signal to the third receiving unit.

9. The method for arranging chips as claimed in claim 8, wherein a proportion of the overlapping width relative to the maximum one of projection widths of the first transmitting unit set and the second transmitting unit set in the second direction is greater than or equal to 0% and smaller than 100%.

10. The method for arranging chips as claimed in claim 8, wherein there is a gap between the first transmitting unit and the second transmitting unit in the second direction, and there is the gap between the third transmitting unit and the fourth transmitting unit in the second direction, wherein a proportion of the overlapping width relative to the maximum one of projection widths of the first transmitting unit set and the second transmitting unit set in the second direction is f, wherein the gap is greater than or equal to 5 µm and smaller than or equal to 20 µm, and the proportion f is greater than or equal to 55% and smaller than or equal to 75%.

11. The method for arranging chips as claimed in claim 8, wherein the shift distance is defined as a distance between a geometric center of the first transmitting unit set and a geometric center of the second transmitting unit set in the second direction, the shift distance is greater than 0 µm and smaller than or equal to ½ of a width summation of the first transmitting unit set and the second transmitting unit set in the second direction.

12. A method for arranging chips, adapted to signal transmission between the chips, and the method for arranging chips comprising:

disposing a first transmitting unit set and a second transmitting unit set adjacent to each other on a surface of a first chip along a first direction, wherein the first transmitting unit set is configured to transmit an input signal, and the second transmitting unit set is configured to transmit another input signal;

disposing a first receiving unit set and a second receiving unit set on a surface of a second chip respectively corresponding to the first transmitting unit set and the second transmitting unit set, wherein the first receiving unit set receives the input signal from the first transmitting unit set, and the second receiving unit set receives the another input signal from the second transmitting unit set, and the second chip is disposed opposite to the first chip, wherein the first transmitting unit set and the second transmitting unit set have a shift distance in a second direction, the second direction is different to the first direction, the shift distance is greater than 0 µm, and the first transmitting unit set and the second transmitting unit set form an overlapping width at a junction of projections thereof in the second direction, wherein the first transmitting unit set comprises a first transmitting unit and a second transmitting unit, the first transmitting unit and the second transmitting unit are arranged adjacent to each other along the second direction;

the first receiving unit set comprises a first receiving unit and a second receiving unit, the first receiving unit and the second receiving unit respectively correspond to a configuration relationship of the first transmitting unit and the second transmitting unit, and are arranged adjacent to each other along the second direction;

the second transmitting unit set comprises a third transmitting unit and a fourth transmitting unit, the third transmitting unit and the fourth transmitting unit are arranged adjacent to each other along the second direction; and the second receiving unit set comprises a third receiving unit and a fourth receiving unit, the third receiving unit and the fourth receiving unit respectively correspond to a configuration relationship of the third transmitting unit and the fourth transmitting unit, and are arranged adjacent to each other along the second direction;

disposing the second transmitting unit and the third transmitting unit between the first transmitting unit and the fourth transmitting unit in the second direction; and disposing the second receiving unit and the third receiving unit between the first receiving unit and the fourth receiving unit in the second direction, wherein the input signal comprises an inverted signal of a first input signal and an inverted signal of a second input signal, the another input signal comprises the first input signal and the second input signal, the first transmitting unit transmits the inverted signal of the second input signal to the first receiving unit, the second transmitting unit transmits the inverted signal of the first input signal to the second receiving unit, the third transmitting unit transmits the first input signal to the third receiving unit, and the fourth transmitting unit transmits the second input signal to the fourth receiving unit.

13. The method for arranging chips as claimed in claim 12, wherein there is a gap between the first transmitting unit and the second transmitting unit in the second direction, and there is the gap between the third transmitting unit and the fourth transmitting unit in the second direction, wherein a proportion of the overlapping width relative to the maximum one of projection widths of the first transmitting unit set and the second transmitting unit set in the second direction is f, wherein the gap is greater than or equal to 5 μm and smaller than or equal to 20 μm, and the proportion f is greater than or equal to 60% and smaller than 100%.

* * * * *